United States Patent
Briggs

(10) Patent No.: US 7,085,873 B1
(45) Date of Patent: Aug. 1, 2006

(54) ATA DEVICE ACCESS SYSTEM WITH SURROGATE REGISTERS CORRESPONDING TO ATA REGISTERS

(75) Inventor: Randall Don Briggs, Boise, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 324 days.

(21) Appl. No.: 10/177,818

(22) Filed: Jun. 21, 2002

(51) Int. Cl.
*G06F 1/00* (2006.01)

(52) U.S. Cl. ........................ 710/305; 710/311; 710/310

(58) Field of Classification Search ........ 710/305–315, 710/62–68, 29, 36–38, 8–19, 33–34, 73, 710/105, 72; 712/218–219, 244–245; 713/1–2
See application file for complete search history.

(56) References Cited

U.S. PATENT DOCUMENTS

| | | | | |
|---|---|---|---|---|
| 5,280,602 A * | 1/1994 | Holt | | 711/4 |
| 5,303,354 A * | 4/1994 | Higuchi et al. | | 712/218 |
| 5,701,450 A * | 12/1997 | Duncan | | 712/245 |
| 6,233,640 B1 * | 5/2001 | Luke et al. | | 710/315 |
| 6,247,087 B1 * | 6/2001 | Riley et al. | | 710/309 |
| 6,275,879 B1 * | 8/2001 | Goodfellow | | 710/74 |
| 6,618,788 B1 * | 9/2003 | Jacobs | | 710/315 |
| 6,779,062 B1 * | 8/2004 | Eschmann et al. | | 710/74 |
| 2002/0062387 A1 * | 5/2002 | Yatziv | | 709/236 |
| 2004/0210681 A1 * | 10/2004 | Eschmann et al. | | 710/8 |

* cited by examiner

*Primary Examiner*—John R. Cottingham
*Assistant Examiner*—Raymond N Phan
(74) *Attorney, Agent, or Firm*—Marger Johnson & McCollom, P.C.

(57) ABSTRACT

An ATA device access system preferably includes surrogate registers that correspond to ATA registers. A command register can be configured to control data transfer between the ATA and surrogate registers. A status register can be configured to signal completion of data transfer to or from the surrogate registers. Using the ATA device access system, data can be written to the surrogate registers during a write operation with little or no wait and then transferred to the ATA registers without tying up a bus or a processor. Similarly, data can be loaded into the surrogate registers from the ATA registers during a read operation with little or no wait, before being read from the surrogate registers by a processor.

21 Claims, 3 Drawing Sheets

| Register Name (writes) | Register Name (reads) |
|---|---|
| ATA Data | ATA Data |
| ATA Features | ATA Error |
| ATA Sector Count | ATA Sector Count |
| ATA Sector Number | ATA Sector Number |
| ATA Cylinder Low | ATA Cylinder Low |
| ATA Cylinder High | ATA Cylinder High |
| ATA Device/Head | ATA Device/Head |
| ATA Command | ATA Status |
| ATA Device Control | ATA Alt Status |

ATA DEVICE ACCESS SYSTEM WITH SURROGATE REGISTERS CORRESPONDING TO ATA REGISTERS

BACKGROUND OF THE INVENTION

1. Field of the Invention

The present invention relates to methods of accessing AT Attachment (ATA) devices. More particularly, this invention relates to a method of reducing the access latency to an ATA device.

2. Description of the Related Art

ATA devices include, for example, hard drives, removable media drives (e.g., disk drives, flash memory card interfaces, CD-ROM drives, etc.), and other devices. The ATA (and ATA Packet Interface (ATAPI)) standards include an access protocol for how data may be stored and retrieved from the ATA device. This protocol includes commands that are passed, interpreted, and responded to. When a system that includes an ATA interface wishes to access an attached ATA device, it must carry out the access protocol. The protocol generally consists of writing certain commands and reading or writing data from particular registers inside the ATA device. The ATA specification outlines the access protocol in great detail.

FIG. 1 is a table listing conventional read and write registers of a typical ATA device. FIG. 2 is a schematic block diagram illustrating a conventional ATA device access system 50. Referring to FIGS. 1 and 2, an ATA Interface 20 provides access to the ATA device 10 through a set of registers 12, such as those listed in FIG. 1. These registers 12 physically reside inside the ATA device 10. The interface 20 accesses the device 10 by writing certain registers 12 with data transfer information, such as the location of the desired data, and waiting until certain values are read from other registers 12 such as the ATA Status register. Device operations such as SET FEATURES, IDENTIFY DEVICE, etc., are performed in this manner. The configuration and operation of these registers 12 is known to those skilled in the art and a more detailed description can be found, for instance, in the ATA specification.

Data is stored in an ATA device 10 through write commands and retrieved through read commands. The ATA specification outlines the bus signaling that is carried across the ATA cable 25 in order to access the ATA registers 12. The specification further dictates how fast these signals can be asserted or deasserted through Programmed Input/Output (PIO) modes.

The PIO mode determines how fast data is transferred to and from the ATA device 10. There are currently five Programmed Input/Output (PIO) modes. In some PIO modes, register access can be extremely slow. In the slowest possible mode (PIO mode 0), for instance, the minimum data cycle time is about 600 nanoseconds (nS). In addition, the access time can be further extended by deassertion of an Input/Output channel Ready (IORDY) signal.

Slow access to ATA device registers 12 can cause slow access to the Amba Advanced High-performance Bus (AHB) 40, depending on how the ATA interface 20 is implemented. Slow bus access can tie up the AHB 40 for extended periods of time and cause several problems. Among other things, while the AHB 40 is tied up, it can't process other requests. The processing speed is therefore reduced as latency increases for other masters to get to the AHB 40.

Some conventional ATA devices use state machines to implement the register access protocol of the ATA specification. In these devices, the state machine is given a command and carries out the protocol necessary to transfer the data. This approach insulates the AHB accesses from the potentially slow ATA register accesses. It also requires no assistance from the system processor 30 in carrying out the ATA access protocol.

The state machine approach has a number of disadvantages. Among other things, this approach is difficult to implement since the ATA protocol involves many complex commands. This approach is also costly because it requires a large number of logic gates. Furthermore, if an error is found in the state machine, fixing it is very hard and may require a new revision of silicon.

Another conventional solution utilizes a processor 30 to read from and write to the various ATA registers 12 directly to carry out the protocol. This processor 30 is generally not dedicated to the ATA interface 20 only, but is typically a central resource in the system where the ATA device 10 resides. Hardware in the device interface 20 provides a means to address and access the set of device registers 12, such as those shown in FIG. 1. This approach moves the complexity of the protocol into processor code where it is easier to deal with than in the state machine approach. This approach also has disadvantages, however.

In a conventional ATA device design, the ATA registers 12 are directly coupled to the processor register access. Although using a processor 30 to directly access the ATA registers 12 solves the problems of the state-machine method, this approach has the negative side effect of adding long bus waits on reads and writes. FIG. 4A is a timing diagram illustrating the drawbacks of this approach. As can be seen from FIG. 4A, the bus and processor are both tied up during device access using this approach.

As noted earlier, the ATA specification provides various speeds for accessing the registers 12. In the slowest mode (PIO mode 0), a register access from the ATA interface 20 to the ATA device 10 takes approximately 600 nS. Device assertion of the IORDY signal can further extend the access time to last over 1 microsecond (uS). In a typical 60 megahertz (MHz) processor bus, the 1 uS delay will tie up the bus 40 for sixty clock cycles.

This is damaging to a system using the ATA interface 20 in at least two ways. First, the bus 40 is tied up. Tying up the bus 40 inhibits DMA traffic and may lead to buffer overflow or underflow. For example, an I/O block 34 may be transferring data over the AHB system bus 40 to a RAM block 32. If the bus 40 becomes tied up for a long period of time, a buffer inside the I/O block 34 receiving I/O data from an external source may overflow, since it is unable to empty itself into the RAM block 32 in a timely fashion.

Second, the processor 30 is occupied. Locking up the processor 30 may lead to delay in servicing interrupts and other processing tasks in a timely fashion. In a real-time application such as a printer controller, each of these problems can lead to faulty operation of the printer.

The primary drawback of the CPU approach is that it creates a "bad bus citizen" by tying up the bus 40 for long periods of time. The AHB system bus 40 provides a "split" slave response as a way of dealing with devices that have a long latency and solving the bad bus citizen problem. In the AHB split, the ATA interface 20 gives the processor 30 a split response in order to release the processor 30 from immediate access and free up the bus 40. Once the ATA interface 20 has finished accessing the slow target device 10, it notifies the system. The processor 30 then accesses the ATA interface 20 to complete the split access with no delays. In an AHB split of a read operation, for example, the read operation is performed off the AHB 40, thus freeing up the bus 40 for other master commands.

The trouble with this approach is that when an AHB master (in this case, the processor 30) receives a "split" response, its sole purpose at that point becomes to try to access the ATA interface 20 again in order to complete the access. This is because the AHB protocol presently allows only a single outstanding transaction per bus master. Thus the AHB is freed up for DMA traffic to flow, but the processor is still effectively tied up. In this case, it is consumed with completing the split access, whereas formerly it was tied up waiting for a bus cycle to complete. The AHB split therefore frees the bus, but not the processor.

SUMMARY OF THE INVENTION

An ATA device access system according to an embodiment of this invention preferably includes a plurality of ATA registers, a plurality of surrogate registers corresponding to the ATA registers, and a command register configured to control data transfer between the ATA and surrogate registers. A status register can also be included and configured to signal completion of data transfer to or from the surrogate registers. Means for determining how many registers of a request have been serviced can also be provided, such as through a processor that is programmed to recognize when registers have been serviced and/or through register bits that are cleared to indicate register servicing.

Using an ATA device access system constructed according to the foregoing embodiment of this invention, data can be written to the surrogate registers during a write operation with little or no wait (e.g., a zero wait state) and then transferred to the ATA registers without tying up the bus or the processor. Similarly, data can be loaded into the surrogate registers from the ATA registers during a read operation before being read from the surrogate registers by the processor with little or no wait. A command register can be used to determine which registers to read from or write to. The surrogate registers are preferably configured to communicate with a data bus, such as an AHB.

A method of accessing an ATA register preferably includes sending an access command to a command register, transferring data between an ATA register and a corresponding surrogate register based on instructions from the command register, and accessing the surrogate register via a data bus. The access command can, for instance, be a read command or a write command. When the access command is a write command, the surrogate register can be accessed before data is transferred between the surrogate register and the ATA register. In this case, accessing the surrogate register preferably means writing data to the surrogate register with little or no wait. When the access command is a read command, data can be transferred from the ATA register to the surrogate register before the surrogate register is accessed via the data bus. An ATA access protocol is therefore preferably carried out by reading and writing appropriate values to the ATA registers as directed by the ATA standard and using the surrogate registers as describe earlier to access the ATA registers.

BRIEF DESCRIPTION OF THE DRAWINGS

The foregoing and additional aspects and advantages of the present invention will become more readily apparent through the following detailed description of preferred embodiments, made with reference to the attached drawings, in which.

DETAILED DESCRIPTION OF PREFERRED EMBODIMENTS

The principles of the present invention will be described more fully hereinafter with reference to preferred embodiments thereof. It should be noted, however, that these embodiments are provided by way of example, and not by way of limitation, and that the embodiments disclosed herein may be modified in form and detail without departing from the principles and scope of the invention.

According to a preferred embodiment of this invention, a "bus-friendly" interface is provided between a processor bus (e.g., an AHB) and an ATA device (e.g., a disk drive). The interface acts as a good bus-citizen by enabling fast read and write access and by not holding the bus "hostage" for long periods of time. Although the bus described in the following description of the preferred embodiments of the invention is an Amba AHB, the principles of this invention are applicable to other busses as well.

The following preferred embodiments utilize a CPU-type approach, but solve the "bad bus citizen" problem described earlier to provide improved read and write access of an ATA device. The inherent advantages of a CPU approach are its flexibility and low cost. Its flexibility comes from implementing the ATA protocols in software. Avoiding dedicated, complex state-machine hardware also reduces cost.

Figure 3:
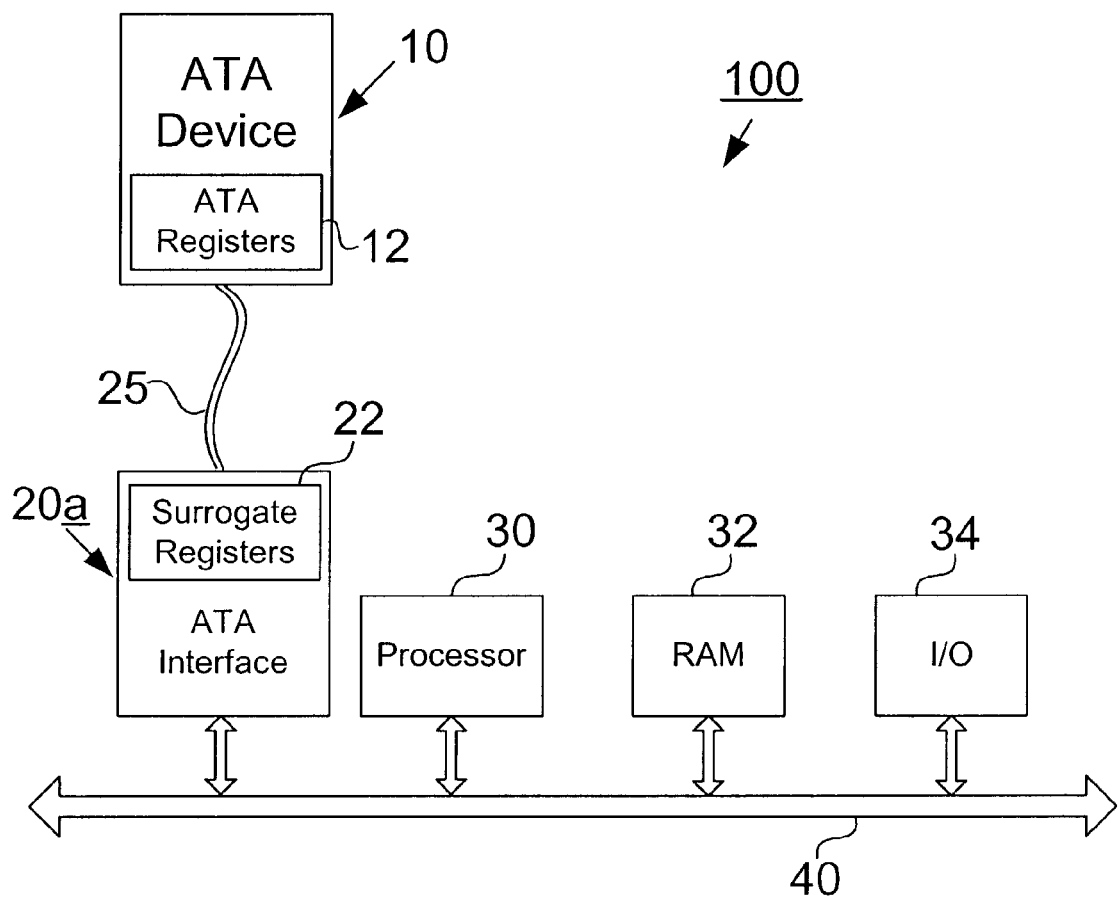
FIG. 3 is a schematic block diagram illustrating an ATA device communication system configuration according to a preferred embodiment of the invention.

FIG. 3 is a schematic block diagram of an ATA device access system 100 according to a preferred embodiment of this invention. Referring to FIG. 3, in the preferred embodiment, access to ATA registers 12 is decoupled from direct access by the processor 30. Decoupling processor access is preferably accomplished by providing each of the ATA device registers 12 with a corresponding register from a set of "surrogate" (or shadow) registers 22. The registers in this second set of registers 22 are called surrogate registers because they take the place of the real registers 12 in certain ATA device operations. These surrogate registers 22 can be accessed quickly without tying up the bus or the processor.

For example, when software wants to write to ATA registers 12, selected corresponding registers from the set of surrogate registers 22 are first written to with little or no wait (e.g., at a zero wait state). A command register is written directing the appropriate surrogate registers 22 to be dumped to corresponding device registers 12. The command register contains a vector field to indicate which of the surrogate registers 22 are to be transferred to the ATA registers 12. Using this approach, the transfer of the surrogate registers 22 to the ATA device registers 12 may proceed slowly without tying up either the bus 40 or the processor 30. Multiple surrogate registers 22 can be transferred in a pre-determined order using a single request. A small amount of control circuitry can be used to individually transfer the surrogate registers 22. This logic, however, is significantly simpler than the full state-machine used in the conventional approach discussed earlier because the full state-machine solution must also implement the various protocols of the ATA specification.

In one embodiment, a status register can include a bit that can be polled to determine when the transfer is complete. Alternatively, an interrupt can be provided to signal transfer completion. As each register requested in the vector field is transferred to the ATA device, its individual bit is cleared. This provides a means for determining how many registers of a request were serviced if the transfer is interrupted by the system, such as in the case of removable media being removed. This aspect provides a form of write-posting.

Read operations are handled in a similar fashion. In this case, the command register is written with a vector to indicate which of the surrogate registers 22 should be loaded from the ATA device registers 12. Once again, a bit can be polled or an interrupt sent when the read operation is complete and the ATA device data is in the appropriate surrogate register(s). At that point the software can read those registers with little or no wait. As each register requested in the vector field is transferred from the ATA device 10, its individual bit is cleared. The processor 30 can poll these bits to determine which registers have been serviced. This approach provides a means for determining how many registers of the request were serviced if the transfer is interrupted by the system. This aspect provides a form of split-transactions.

According to this embodiment, therefore, a second set of registers 22 can be used to free up the AHB 40 and the processor 30 during an ATA device 10 read or write operation. In a preferred approach, the ATA registers 12 are each provided with a corresponding one of the surrogate registers 22. When the software writes to an ATA register, its surrogate register is first written (e.g., with a zero wait state) and a command register is then directed to dump the contents of the surrogate register to the ATA register of the device 10. The command register preferably has a bit that can be polled or an interrupt to signal completion of the write operation. Read operations can be handled in a similar fashion. In this way, both the AHB 40 and the processor 30 are freed during the read and write operations to the ATA device 10.

A further embodiment provides benefits specific to read accesses of the ATA device 10. The ATA device 10 does not normally modify certain ones of the ATA registers 12 that support both write and read capabilities. These registers include Sector Count, Sector Number, Cylinder Low, Cylinder High, and Device/Head. Accordingly, to optimize transfer speeds, according to this embodiment, when the processor 30 reads these registers, the ATA interface 20a simply returns the last value written to it by the firmware, and does not access the ATA device registers 12. To do this, the last value written to these registers is stored locally. When those registers are read, no access to the ATA device 10 is required to fetch their value. This feature can be enabled or disabled on a register-by-register basis to suit specific user needs. This optimization provides a form of register shadowing.

Application of the ATA device access system described earlier can be particularly effective in a cost-sensitive embedded application, such as an ink-jet print controller. In a printing system, for example, there are real-time constraints that must be met for correct operation of the printer. The print data must be provided from system RAM to the print head at a sufficient rate to keep up with the consumption and printing of such data by the head. Additionally, the motors that move the print head across the paper also require periodic attention from the processor and must receive such attention in a timely fashion. Failure to meet either requirement will result in printing failure. In the print controller, the ATA system would look the same as shown in FIG. 3, except that an additional block would be added to the bus to provide an interface to the inkjet head/motors. Other embedded systems that could benefit from the ATA device access system described earlier include digital television recorders (set-top boxes).

Figure 4A:
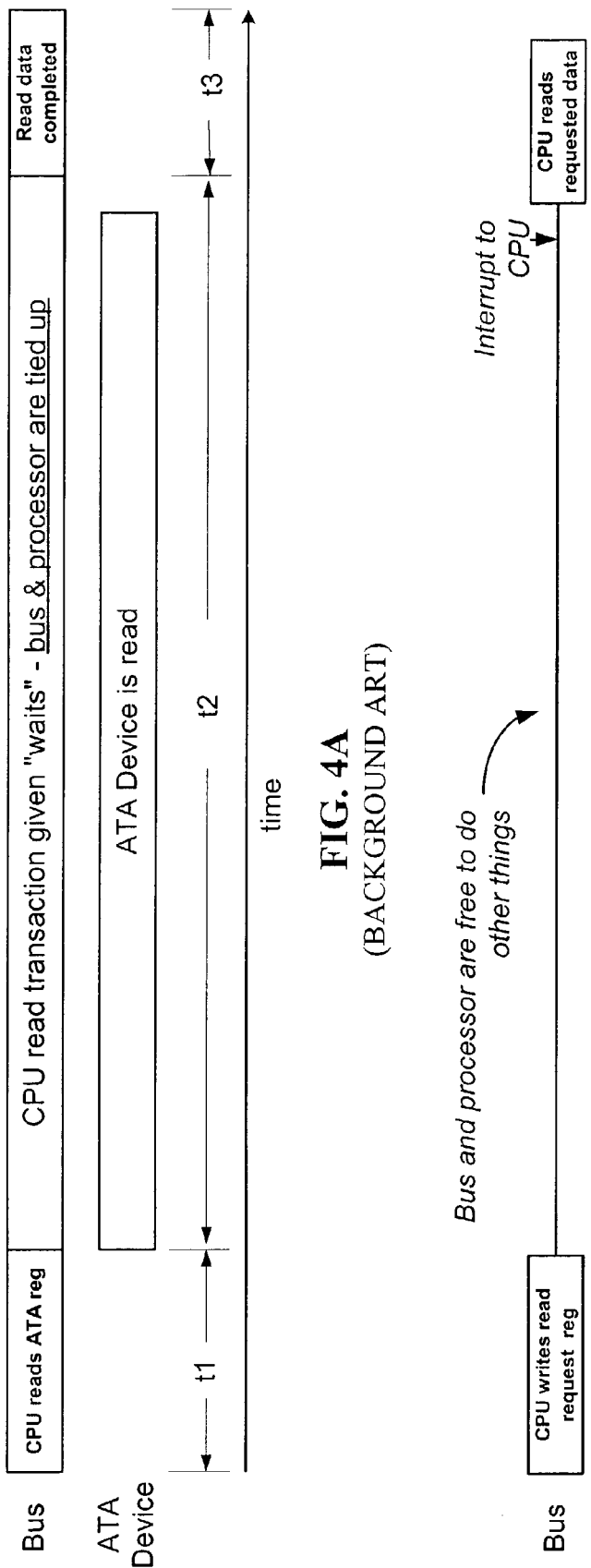
FIGS. 4A and 4B are timing diagrams comparing a conventional ATA device access scheme with a device access scheme according to a preferred embodiment of the invention.
Figure 4B:
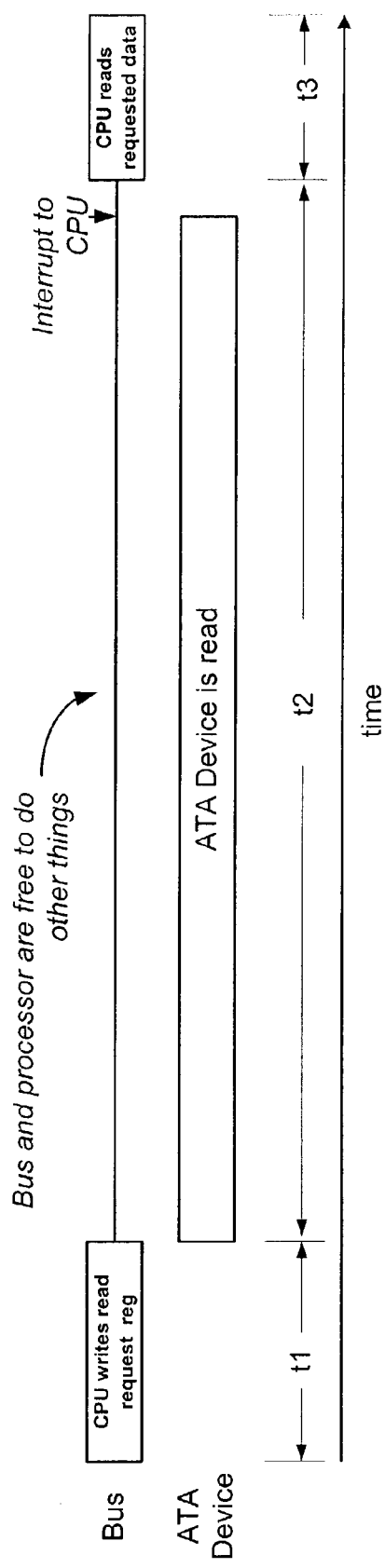

As described earlier, the preferred embodiments of this invention solve the problem of bus delay encountered by the traditional CPU approach to ATA device communication, without incurring the cost of the full state-machine approach. That benefit will now be described in more detail with reference to FIGS. 4A and 4B. FIGS. 4A and 4B are timing diagrams respectively illustrating the timing of the conventional CPU approach and the timing of the approach of a preferred embodiment of this invention.

Figures 1, 2:
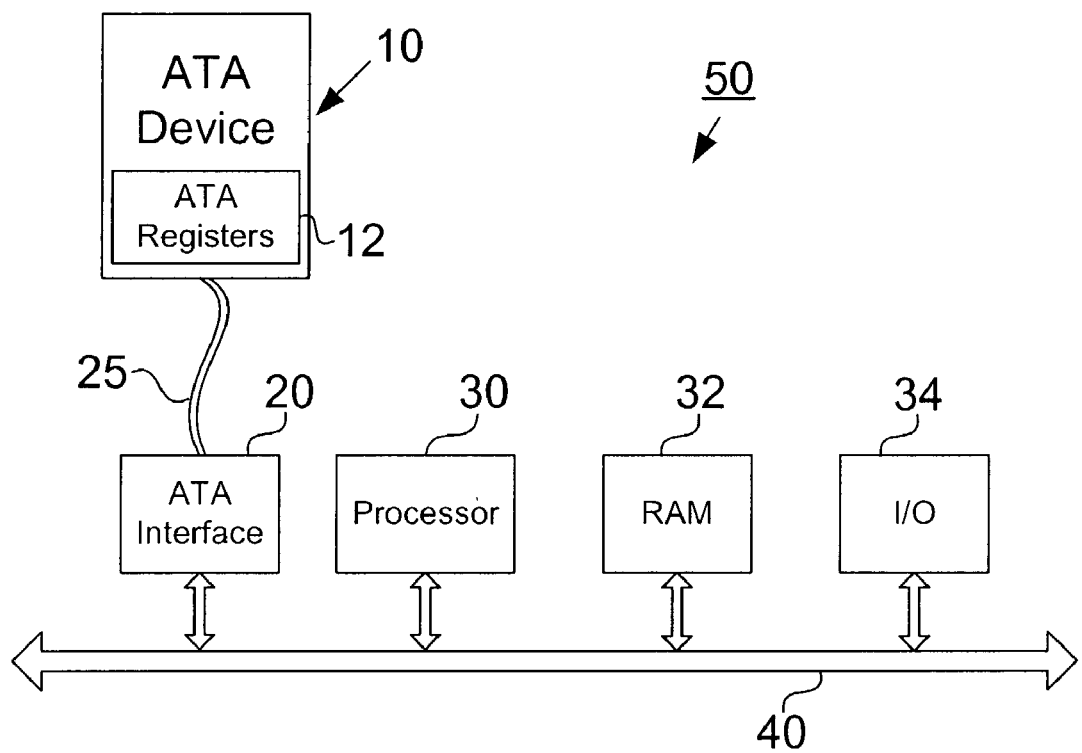
FIG. 1 is a table showing a list of various conventional ATA device registers for read and write operations.
FIG. 2 is a schematic block diagram illustrating a conventional system for communicating with an ATA device.

Referring to FIGS. 2 and 4A, in the conventional CPU approach, the processor 30 requests a read from the ATA device 10 during a first time period t1. The selected register 12 of the ATA device 10 is then read during a second time period t2, with the accessed data moving from the ATA register 12 into the ATA interface 20. The read operation is completed during a third time period t3, with the data finally moving from the ATA interface 20, across the AHB 40, and into the processor 30. During the second time period t2, the bus 40 and the processor 30 are tied up and are unable to service any other requests. This causes the system problems outlined previously.

Referring to FIGS. 3 and 4B, a method of accessing an ATA device 10 according to a preferred embodiment provides a way of moving the access to ATA registers 12 off of the AHB 40 to free both the bus 40 itself and the processor 30 to process other requests while the device access is proceeding. Similar to the conventional system, during the first time period t1, the processor 30 requests a read from the ATA device 10. The CPU does this, however, not by directly reading the ATA register 12, but by writing to a read request register to instruct a read operation to proceed. During the second time period t2, the read operation is then performed to transfer data from the ATA device registers 12 to surrogate registers 22 off of the AHB 40 and without processor 30 involvement. During this second time period t2, therefore, the bus and processor are available for other tasks. For example, a DMA transfer of data from an I/O block 34 to a RAM block 32 may take place, or the processor can be left free to service an interrupt request from the I/O block 34. When the transfer between the ATA 12 and surrogate registers 22 is complete, an interrupt can then be sent to notify the processor 30, which completes the read during a third time period t3 by reading from the surrogate registers 22 with little or no wait.

More specifically, according to this preferred embodiment, surrogate registers 22 are provided for each of the device's ATA registers 12. Each of the surrogate registers 22 is preferably provided with a status bit that can be polled to indicate when the transfer for that particular register is complete. An interrupt is provided to signal transfer completion when all of the requested registers have been transferred. The interrupt thereby notifies processor 30 when the ATA device 10 access is complete and the appropriate data is in the surrogate registers 22. If the data is being written to the ATA device 10, it can be written to the surrogate registers 22 from the processor 30 with little or no wait (e.g., a zero wait state) and then written to the ATA registers 12. In a read operation, once the data is in the surrogate registers 22, the read can take place with little or no wait. As indicated, this frees up both the bus 40 and the processor 30 during device access.

In summary, an ATA device access system preferably includes a plurality of ATA registers, a plurality of surrogate registers corresponding to the ATA registers, and a command register configured to control data transfer between the ATA and surrogate registers. The command register can be used, for instance, to determine which registers to read from or write to. A status register can also be included and configured to signal completion of data transfer to or from the surrogate registers. Means for determining how many registers of a request have been serviced can also be provided, such as through register bits that are cleared as requests are serviced. Data is written to the surrogate registers during a write operation with little or no wait and then transferred to the ATA registers without tying up the bus or the processor.

Similarly, data is loaded into the surrogate registers from the ATA registers during a read operation before being read from the surrogate registers with little or no wait. The surrogate registers are preferably configured to communicate with a data bus, which is preferably an Amba AHB.

A method of accessing an ATA register is also provided and includes sending an access command to a command register, transferring data between an ATA register and a corresponding surrogate register based on instructions from the command register, and accessing the surrogate register via a data bus. The access command can, for instance, be a read command or a write command. When the access command is a write command, the surrogate register can be accessed before data is transferred between the surrogate register and the ATA register. In this case, accessing the surrogate register preferably includes writing data to the surrogate register with little or no wait. When the access command is a read command, data can be transferred from the ATA register to the surrogate register before the surrogate register is accessed via the data bus.

While the principles of this invention have been shown and described with reference to preferred embodiments thereof, it will be understood by those skilled in the art that various changes in form and details may be made without departing from those principles. The invention should therefore be interpreted to encompass all such variations coming within the spirit and scope of the appended claims.

What is claimed is:

1. An AT Attachment (ATA) device access system, comprising:
   a plurality of ATA registers located in an ATA device;
   a plurality of surrogate registers located in an ATA interface, each surrogate register corresponding to one of the ATA registers located in the ATA device; and
   a command register configured to control data transfer between one or more of the ATA registers and the corresponding one or more of the surrogate registers,
   wherein the surrogate registers are configured to store ATA device data loaded into the one or more ATA registers and then provide the ATA device data in response to an ATA device read command.

2. A system according to claim 1, further comprising a status register configured to signal completion of data transfer to or from one of the surrogate registers and the corresponding one of the ATA registers.

3. A system according to claim 1, further comprising means for determining how many registers of a request have been serviced.

4. A system according to claim 1, wherein data is written to one or more of the surrogate registers during a write operation and then transferred to the corresponding one or more of the ATA registers.

5. A system according to claim 1, wherein data is loaded into one or more of the surrogate registers from the corresponding one or more of the ATA registers during a read operation before being read from the one or more of the surrogate registers.

6. A system according to claim 1, wherein the command register is used to determine which registers to read from or write to, wherein data is written to one or more of the surrogate registers during a write operation and then transferred to the corresponding one or more of the ATA registers, and wherein data is loaded into one or more of the surrogate registers from the corresponding one or more of the ATA registers during a read operation before being read from the one or more of the surrogate registers.

7. A system according to claim 1, wherein the surrogate registers are configured to communicate with a data bus.

8. A system according to claim 1, wherein the ATA device access system is used in an embedded system.

9. A system according to claim 8, wherein the embedded system is an ink-jet print controller.

10. A method of accessing an AT Attachment (ATA) register, said method comprising:
    sending an access command to a command register;
    transferring data between an ATA register located in an ATA device to a corresponding surrogate register based on instructions from the command register, the surrogate register located in an ATA interface; and
    accessing the surrogate register located in the ATA interface via a data bus,
    wherein accessing further comprises a processor using the data bus to either write ATA device data to the surrogate register or read ATA device data from the surrogate register.

11. A method according to claim 10, wherein the access command is a write command and wherein the surrogate register is accessed before data is transferred between the surrogate register and the ATA register.

12. A method according to claim 11, wherein accessing the surrogate register comprises writing data to the surrogate register.

13. A method according to claim 10, wherein the access command is a read command and wherein data is transferred from the ATA register to the surrogate register before the surrogate register is accessed via the data bus.

14. A method according to claim 13, wherein accessing the surrogate register comprises reading data from the surrogate register.

15. A register access system comprising:
    a plurality of AT Attachment (ATA) registers arranged in an ATA device; and
    a plurality of surrogate registers arranged in an ATA interface, wherein the plurality of surrogate registers are configured to store ATA device data received from a processor.

16. A system according to claim 15, wherein the plurality of surrogate registers are configured to communicate with a data bus.

17. A system according to claim 15, wherein the data bus is an Amba Advanced High-performance Bus (AHB).

18. A system according to claim 15, further comprising a command register configured to control data transfer between the ATA registers and the surrogate registers.

19. A system according to claim 15, further comprising a status register configured to signal data transfer completion.

20. A system according to claim 15, wherein data is configured to be written to or read from the surrogate registers with little or no wait.

21. A method of accessing an AT Attachment (ATA) register, said method comprising:
- sending an access command to a command register;
- transferring data between an ATA register located in an ATA device to a corresponding surrogate register based on instructions from the command register, the surrogate register located in an ATA interface;
- accessing the surrogate register located in the ATA interface via a data bus;
- requesting information from the ATA device; and
- receiving a response back from the ATA interface, the response including information written in the corresponding surrogate register;
- wherein the ATA interface does not access the ATA device in response to the information request.

* * * * *